US009266287B2

(12) United States Patent
Kautz et al.

(10) Patent No.: US 9,266,287 B2
(45) Date of Patent: Feb. 23, 2016

(54) 3D PRINTING WITH CUSTOM SURFACE REFLECTANCE

(71) Applicant: DISNEY ENTERPRISES, INC., Burbank, CA (US)

(72) Inventors: Jan Kautz, London (GB); Olivier Roullier, Berlin (DE); Bernd Bickel, Zurich (CH); Marc Alexa, Berlin (DE); Wojciech Matusik, Lexington, MA (US)

(73) Assignee: Disney Enterprises, Inc., Burbank, CA (US)

( * ) Notice: Subject to any disclaimer, the term of this patent is extended or adjusted under 35 U.S.C. 154(b) by 262 days.

(21) Appl. No.: 14/030,176

(22) Filed: Sep. 18, 2013

(65) Prior Publication Data

US 2015/0079327 A1 Mar. 19, 2015

(51) Int. Cl.
*G06F 19/00* (2011.01)
*B29C 67/00* (2006.01)
*B33Y 50/02* (2015.01)
*B29L 31/00* (2006.01)
*B33Y 80/00* (2015.01)

(52) U.S. Cl.
CPC ............ *B29C 67/0088* (2013.01); *B33Y 50/02* (2014.12); *B29K 2995/003* (2013.01); *B29K 2995/0026* (2013.01); *B29L 2031/773* (2013.01); *B33Y 80/00* (2014.12); *Y10T 428/21* (2015.01); *Y10T 428/24355* (2015.01)

(58) Field of Classification Search
CPC .... B29C 67/0088; B33Y 50/02; B33Y 80/00; B29K 2995/003; B29K 2995/0026
USPC ......................................................... 700/98
See application file for complete search history.

(56) References Cited

U.S. PATENT DOCUMENTS

| | | | | |
|---|---|---|---|---|
| 2008/0309667 | A1* | 12/2008 | Zhou | G06T 15/506 345/426 |
| 2009/0021513 | A1* | 1/2009 | Joshi | G06T 15/503 345/419 |
| 2009/0040617 | A1* | 2/2009 | Kim | B29C 45/14508 359/599 |
| 2010/0277477 | A1* | 11/2010 | Wang | G06T 15/506 345/426 |

(Continued)

OTHER PUBLICATIONS

Rouiller, Olivier, et al. "3D-printing spatially varying BRDFs." Computer Graphics and Applications, IEEE 33.6 (2013): 48-57.*

*Primary Examiner* — Michael D Masinick
(74) *Attorney, Agent, or Firm* — Marsh Fischmann & Breyfogle LLP; Kent A. Lembke

(57) ABSTRACT

A method for fabricating custom surface reflectance and spatially-varying bi-directional reflectance distribution functions (BDRFs or svBRDFs). The 3D printing method optimizes micro-geometry to produce a normal distribution function (NDF) that can be printed on surfaces with a 3D printer. Particularly, the method involves optimizing the micro-geometry for a wide range of analytic NDFs and simulating the effective reflectance of the resulting surface. Using the results of the simulation, the appearance of an input svBRDF can be reproduced. To this end, the micro-geometry is optimized in a data-driven fashion and distributed on the surface of the printed object. The methods were demonstrated to allow 3D printing svBRDF on planar samples with current 3D printing technology even with a limited set of printing materials, and the described methods have been shown to be naturally extendable to printing svBRDF on arbitrary shapes or 3D objects.

3 Claims, 8 Drawing Sheets

(56) References Cited

U.S. PATENT DOCUMENTS

2010/0296724 A1* 11/2010 Chang ................ G06K 9/00208
                                                                382/154
2011/0007333 A1* 1/2011 Ishii ..................... H04N 1/6033
                                                                358/1.9
2012/0327086 A1* 12/2012 Shimbaru ............... G06T 15/80
                                                                345/427

* cited by examiner

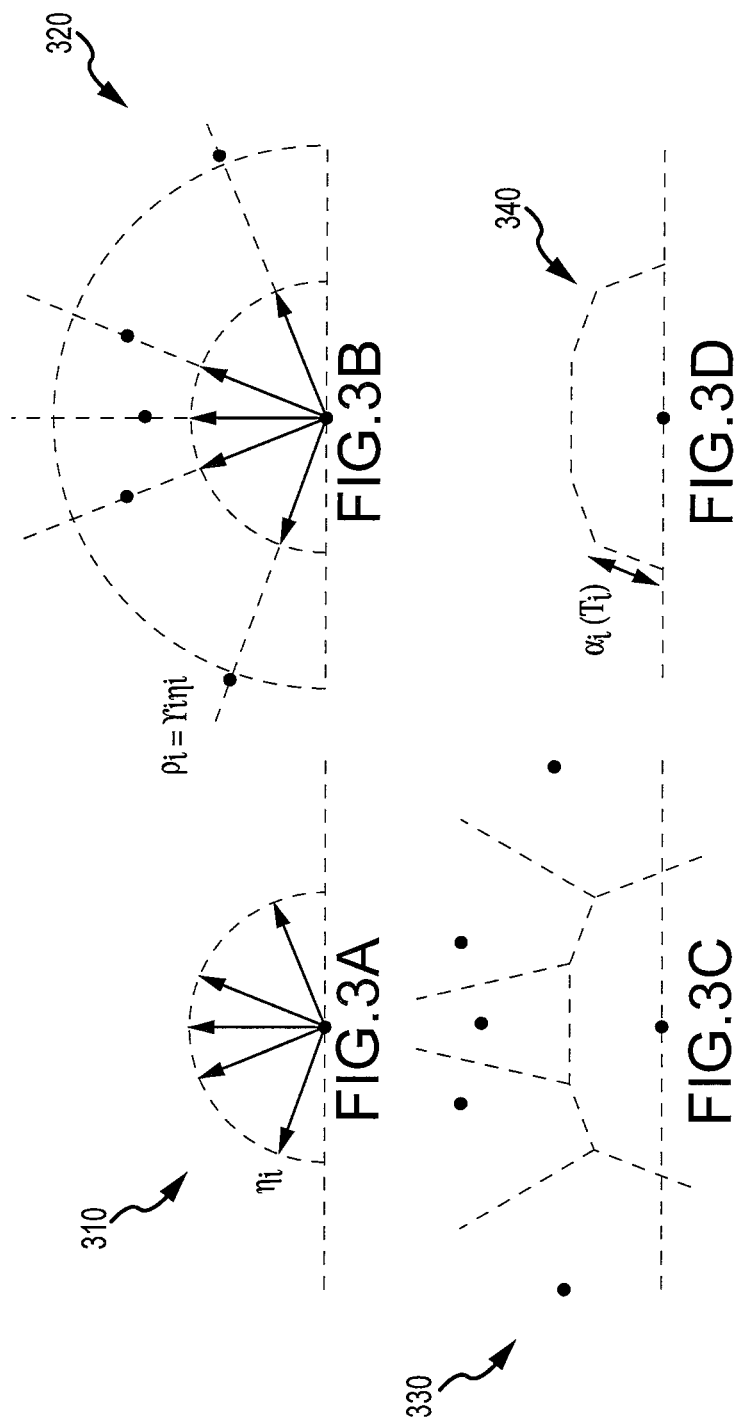

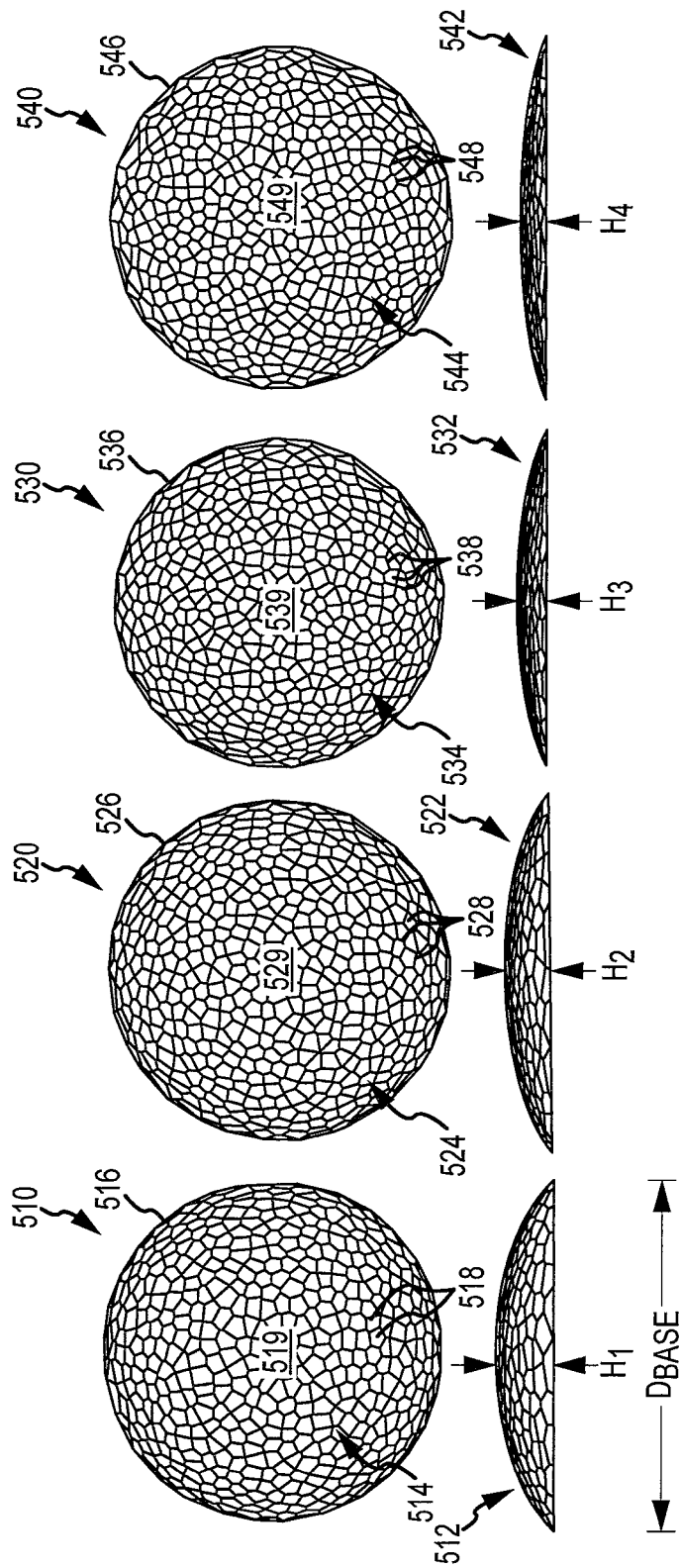

3D PRINTING WITH CUSTOM SURFACE REFLECTANCE

BACKGROUND

1. Field of the Description

The present description relates, in general, to methods and systems for three dimensional (3D) printing, and, more particularly, to methods of controlling 3D printing to fabricate an object having user-selectable or custom surface reflectance on at least portions of the surface of the object.

2. Relevant Background

Additive manufacturing or 3D printing is a process of making a 3D solid object, having virtually any shape, from a digital model. 3D printing is achieved using an additive process in which successive layers of material are laid down or deposited to form different shapes. To perform a print, a 3D printer reads the design from a previously stored data file (e.g., virtual cross sections from a computer aided design (CAD) model or the like) and lays down successive layers of liquid, powder, paper, or sheet material to build the model from a series of cross sections. These layers are joined or automatically fused to create the final shape such that 3D printing can produce almost any shape or geometric feature.

Recent advance in 3D printers have enabled manufacturers and consumers to print 3D objects from 3D models with high accuracy. Printing of colored 3D models is also now possible using a multi-material 3D printer. It is expected that the popularity and use of 3D printers will continue to grow in the coming years especially as costs associated with the 3D printers continues to decrease even as the accuracy of the 3D printers increases over time.

One significant drawback, though, of 3D printing is that the printing devices typically cannot directly replicate the reflection properties or reflectance of an object being created with a 3D model. For example, it may be useful to manufacture an object that has two or three different reflection properties such as being transparent in portions, being highly reflective or having a glossy finish in other portions, and/or being somewhat reflective (and colored, in some cases) or having a matte finish in still other portions of the object. However, with present 3D printing techniques, the reflection properties of the printed object or model are defined by or due to the chosen printing material.

Unfortunately, available printing materials offer a rather restrictive set of reflectance properties such as matte, slightly glossy (e.g., polished plastic or the like), and very specular (e.g., transparent plastic). Further, even if one of these materials is available and provides a desired reflectance for a surface of a printed object or model, existing 3D printers only support a small number of concurrent materials, which severely limits the gamut of printable reflectance.

SUMMARY

The present description is directed toward a 3D printing system and corresponding method for 3D printing objects having a custom surface reflectance. Briefly, the method teaches a technique for printing a 3D object with an outer or micro-surface (e.g., a reflective skin or layer) that has one, two, or more sets of reflectance properties.

The reflective skin or layer provides custom surface reflectance by providing a plurality of reflectance elements (or reflectance-defining 3D objects or micro-structures) that each include a body with a base (which may have a circular, oval, or other cross sectional shape such as a triangular or polygonal shape) and an outer surface/sidewall extending outward from the base (e.g., each reflectance element is defined by a base shape, a maximum base dimension such as less than about 2 millimeters, and a height). The outer surface of each reflectance element is used to define reflectance and includes numerous facets or adjoining faces that may be configured (shaped, sized, and so on) so that they have a normal distribution that approximates an input normal distribution function (NDF). The reflective skin or outer layer may also include a diffuse color layer (e.g., the reflective skin may be a bi-layered structure) providing with ink providing areas or regions of one or more colors, and a layer of transparent plastic printed or formed in an additive manner to provide the reflectance elements of the micro-surface to provide or set reflectance properties for each colored region of the ink layer (e.g., the reflectance elements may differ over each colored region to provide differing reflectance).

The inventors recognized from micro-facet theory, which considers a surface as an aggregate of microscopic perfect mirrors with different orientations, that the fraction of light reflected from the surface in a particular direction depends on the distribution of the normals of these mirrors. The resulting reflectance is, therefore, a function of the normal distribution often represented as a normal distribution function (NDF). In fact, many analytical reflectance models use some variant of an NDF, which suggested to the inventors that specific reflectances can be achieved by modifying the micro-scale surface structure of an otherwise highly specular material so as to mimic the perfect mirrors of the micro-facet theory.

A significant problem facing the inventors, though, was how to find or determine a micro-surface that corresponds to a specific NDF. To this end, it may be desirable to geometrically model the reflectances so as to encompass both diffuse and specular components, but this presents two challenges. First, a method is desired to print a combination of diffuse components (e.g., colored) and specular components (e.g., transparent plastic). Second, the surface to replicate the specular components preferably should be smooth and (locally) convex in order to be suitable to the additive nature of 3D printing.

The first challenge is addressed by printing the micro-surface of the reflective skin using transparent plastic (or other transparent or substantially transparent/translucent material) as this allows the reflectance elements to be provided on top of a (mostly) diffuse color or ink layer, yielding a complete reflectance model. The second challenge is addressed using an algorithm (or software routine/program) that creates micro-surfaces made up of individual reflectance elements, which may be dome shaped in some implementations, whose normal distribution approximates the input NDF. The algorithm may, for example, be based on a Voronoi tessellation of the hemisphere with a discrete set of normals. A least squares optimization may then be used to successfully modify a hemispherical base geometry such that the density of the facets/faces on the outer surface of the body of each of the reflectance elements matches the input NDF. This ensures the resulting shape is smooth and convex. The specular coefficient is approximated by appropriately scaling the dome or other reflectance element body shapes. For example, the dome shapes may be evenly distributed over 3D models according to a Poisson Disk distribution, while avoiding strong features. In brief, the inventors describe herein a new computational model for designing micro-structures or reflectance elements to replicate specular and diffuse reflectances and also describe a model to simulate and design effective bidirectional reflectance distribution functions (BRDFs) with the micro-geometry of each reflective layer or skin provided on a 3D printed object. The inventors are unaware of other work to fabricate svBRDF on 3D models.

More particularly, a 3D printed object is provided that may be generated with a single printing operation by a multi-material 3D printer or with two or more printing operations of 3D printers followed by an assembly step. The object includes a base layer and a micro-structure layer covering the base layer. The micro-structure layer includes a back surface (e.g., a planar surface) adjacent the base layer and further includes a front surface opposite the base layer. On the front or outer surface there are provided a plurality of reflectance elements, which are configured with a geometry so as to define a set of reflectance properties (e.g., properties to achieve a user-selected target reflectance). In some cases, the base layer is formed of materials to be diffuse, and the micro-structure layer is formed of a substantially transparent material. Typically, the reflectance elements each are made up of a body extending outward from the front surface, and the body has an outer surface with a plurality of facets providing the set of reflectance properties.

In some embodiments, the facets are optimized so as to be of substantially equal area. In the same or other embodiments, the facets have geometries based on or corresponding to a normal distribution function (NDF) associated with the set of reflectance properties. In such cases, the geometry defines a number, a size, and a shape of the facets. Further, the geometry defines a height and an outer dimension of a base of the body. For example, but not as a limitation, the base of the body may be circular or oval in shape (e.g., to provide hemispherical shaped reflectance elements or "domes" that can be configured to provide a set of reflectance properties for the 3D printed object).

In some cases, the object may have two or more target reflectances. In these cases, the surface of the micro-structure layer may further include a second plurality of reflectance elements configured to define a second set of reflectance properties. These properties may differ from the set of reflectance properties of the first plurality of reflectance elements, whereby the 3D printed object has an outer surface with at least two reflectances (one area can be more specular than another area on the surface of the object).

BRIEF DESCRIPTION OF THE DRAWINGS

FIGS. 3A-3D provide a 2D graphic illustrations of construction, as a Voronoi Cell, of a geometry for a micro-structure or reflectance element to provide an NDF;

FIGS. 5A-5D illustrate top and side views of optimized dome-shaped reflectance elements or micro-structures with increasing specularity and, corresponding, decreasing height;

DETAILED DESCRIPTION

Figure 1:
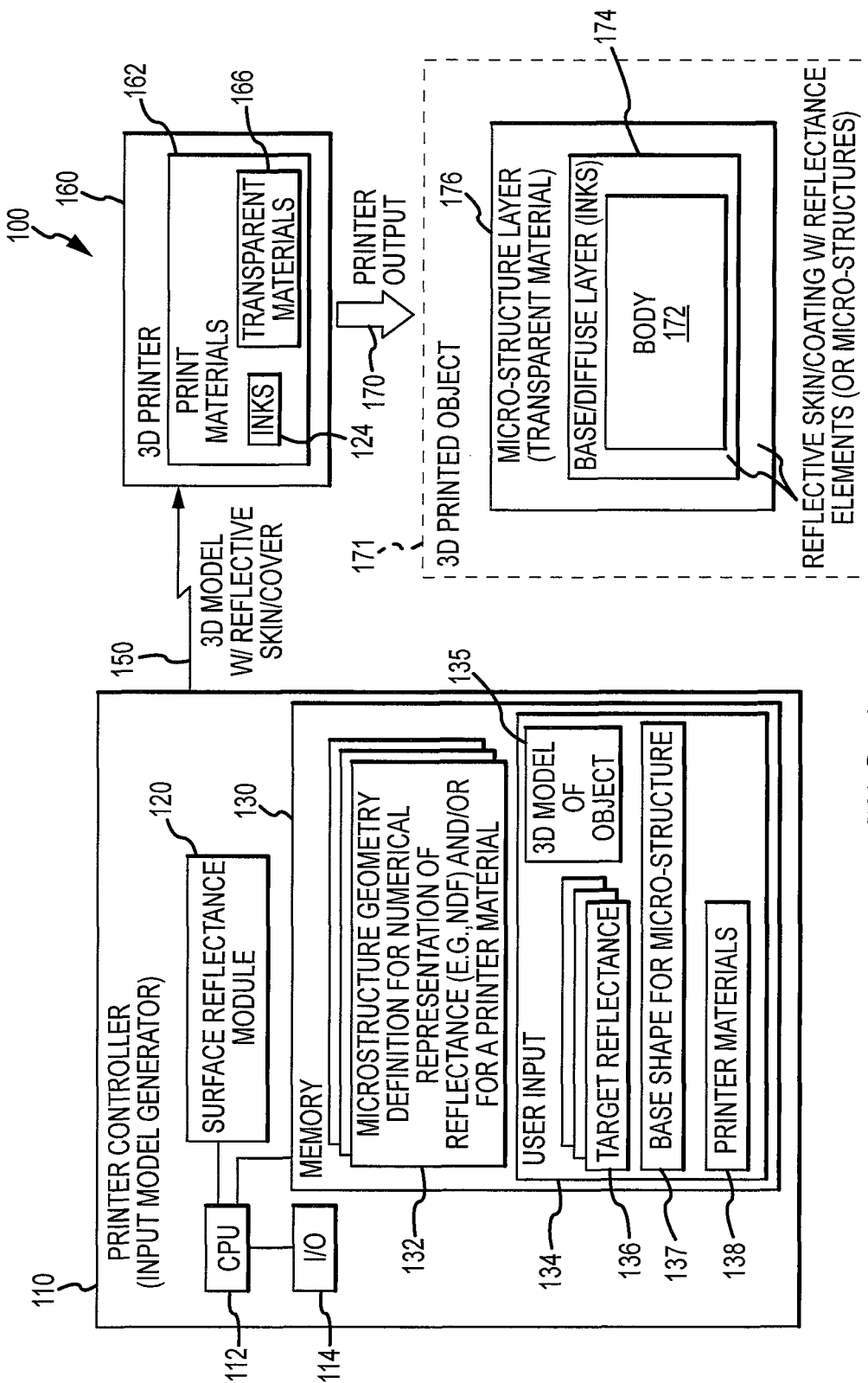
FIG. 1 is a functional block diagram or schematic of a 3D printing system of one embodiment showing a controller/computing device providing a module for creating a 3D model with custom surface reflectance and for providing a 3D model, modified to include a reflective skin or covering layer(s) with micro-structures adapted to provide the custom reflectance, to a 3D printer.

The present description is directed toward methods and systems for using a 3D printer to print objects that have custom surface reflectance such as by providing spatially varying bidirectional reflectance distribution functions (BRDFs). For example, one may print a projection screen that may be installed with a curved surface, and it may be desirable to provide differing reflectance properties in differing areas or regions of the projection screen to as to avoid cross talk of reflected light. This may be achieved through the use of the presently described methods and systems by providing a diffuse color layer (or ink layer) over which is printed or provided a micro-structure containing layer formed of a transparent material (such as plastics used with 3D printers). The two layers may be thought of as a "reflective skin" or "reflectance-defining coating" for a printed 3D object, and the layer of transparent material is formed so as to have numerous reflectance elements or micro-structures each configured to provide a particular reflectance (e.g., with facets providing a micro-surface on the body of the reflectance element that meets a specific normal distribution function (NDF)).

Prior to presenting specifics of the 3D printing systems and methods, it may be useful to more generally discuss techniques for representing and reproducing appearances of various surfaces or real materials that may be modeled or mimicked via 3D printing. BRDFs may be used to represent the optical reflection properties of a surface. The micro-facet theory developed by Torrance and Sparrow shows that a surface can be interpreted as an aggregate of microscopic perfect mirrors of different orientations. Light is being reflected by these tiny mirrors, and the surface reflection is guided by the distribution of the mirror directions (i.e., their normals). A representation of this distribution is a main ingredient in many reflectance models.

Others have proposed a method to fabricate micro-geometry by milling metal away from an outer surface to yield user-controlled highlight (e.g., specular reflectance only). In this proposed method, the normals from a user-defined NDF were sampled and, then, the method involves using simulated annealing to find a CO-continuous micro-surface that can be tiled and milled. This process shows some interesting results, the achieved reflectance had observable artifacts and the milling process made the method hard to implement for curved objects. Some in the field have also shown that by overlaying inks with different reflectances, it is possible to print spatially varying BRDFs with a reasonable gamut such as from mostly diffuse to low glossy. Others have used paper with a static micro-geometry and have then selectively printed opaque or partially opaque ink on portions of that surface to control the resulting specular highlight from specific incident lighting directions. Both techniques only apply to printing on paper and on are not directly extendable to 3D printers. Further, 3D printers have been used to reproduce material appearance. In particular, it has been shown that subsurface scattering can be modeled by 3D printing several layers, and the results were of a high quality. Unfortunately, though, these 3D printer techniques did not apply to 3D printing of spatially varying reflectance on the surface of objects.

FIG. 1 illustrates a 3D printing system 100 that may be used to implement the methods of controlling surface reflectance properties of a printed 3D object as described herein. The system 100 includes a printer controller (or printer input model generator) 110 that operates to generate and output a 3D or digital model 150 of an object with a reflective skin or cover (e.g., a diffuse/base layer and a covering transparent layer with numerous micro-structures or reflectance elements). The model 150 is provided to a 3D printer 160 that uses print materials 162 such as colored inks 164 and transparent materials 166 (e.g., plastic or the like) to deposit layers or cross sections (printer output 170) of the model 150 to create in an additive manner a 3D printed object 171. The 3D printer 160 may be a multi-material printer as shown that can print both layers of the reflective skin/coating or may be a combination of two or more 3D printers with each being a single material or colored printer (e.g., first print the base or diffuse layer 174, second print the micro-structure layer 176, and third apply the micro-structure layer 176 over the base/diffuse layer 174).

The 3D printed object 171 is shown to include a 3D body 172 (which may take nearly any form and shape such a planar body for use in a projection screen, a body of a product or prop for a set where reflection is important, and so on). Over one or more surfaces of the body 172, a base or diffuse layer 174 is applied such as a layer(s) of ink to provide color for one or more regions of the body surface. The object 171 further includes an outer micro-structure layer 176 (e.g., a layer of transparent material such as plastic) with a pattern of numerous micro-structures or reflectance elements provided on the outward facing surface to provide one, two, or more regions with one, two, or more regions with a predefined set of reflectance properties (which may differ from region to region due to the varying geometries of the micro-structures).

To create the 3D model 150, the printer controller 110, which may be a computer or computing device, includes a processor 112 that executes code/program instructions (e.g., in memory) to provide a surface reflectance module 120 (e.g., to act as a special-purpose computer carrying out the algorithm discussed below). The processor 112 further manages input and output devices 114 that allow a user to provide user input 134 and to initiate the surface reflectance module 120 to provide the 3D model 150.

The processor 112 also manages memory or data storage 130 that is used to store a variety of data used by module/algorithm 120 to generate a definition of the geometry of the micro-structures 132. This geometry 132 is typically defined based on a particular numerical representation of reflectance such as an NDF and may also be generated based on the particular printer material 166 used for the transparent micro-structures and also the inks or other materials 164 used to provide the base or diffuse layer 174.

To calculate the geometry 132 and then reflective skin of 3D model 150, user input 134 may be processed by the surface reflectance module 120. This input 134 may include a 3D model of an object 135 (e.g., defining the shape and size of the body 172 of the 3D printed object). Further, the user input 134 may include target reflectances for one or more regions or areas of the outer surface of the body 172. Again, different reflectance properties may be set for two or more areas of the outer surface of the body 172 or a single reflectance may be utilized. The user input 134 may also include a base shape for the micro-structures (e.g., triangular or another polygon, circular, oval, and so on) or a default value may be used (e.g., a circular base). Further, the user input 134 may include the printer materials and/or their optical properties 138 for use by the module 120 in determining the geometry definition 132 as the geometry may vary with the materials/inks and/or colors of the base layer 174 of an object 171. The module 120 takes the target reflectance(s) 136, the base shape 137, and the printer materials (or corresponding optical properties) and generates the geometries 132 of the microstructures to be provided in the micro-structure layer 176 of the reflective skin printed on the body 172 of the 3D printed object 171 (e.g., with one or more dome-shaped structures configured have a normal distribution approximating an input MDF or BRDF). This may involve retrieving predefined shapes from a database storing a plurality of the definitions 132 generated with previous preprocessing.

Figure 2:
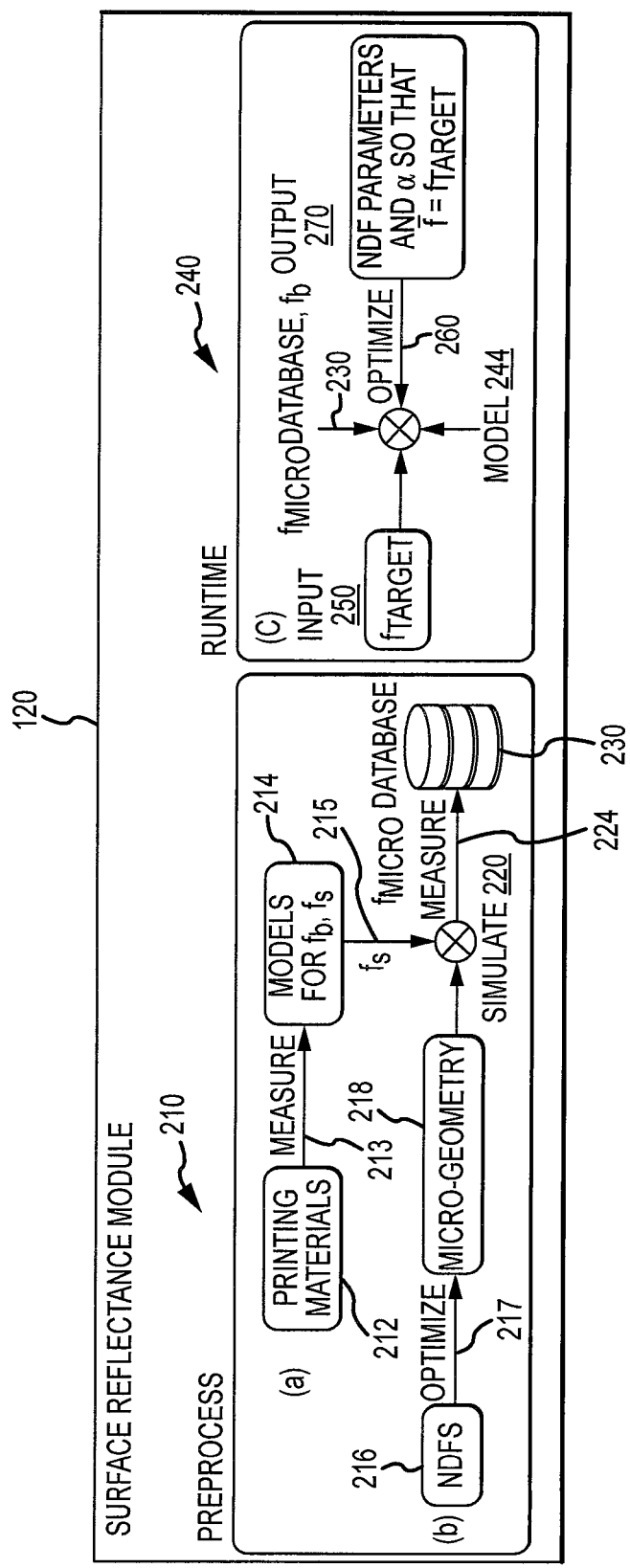
FIG. 2 is a schematic of a processes or functions performed by the surface reflectance module as part of controlling reflectance of a 3D printer surface of an object.

With the general operation of the 3D printing system 100 understood, it may be useful to discuss operation of the surface reflectance module 120 in more detail. To print spatially varying BRDFs, the module 120 may be configured to map a given input BRDF to a micro-geometry that can be applied to the shape of an object (e.g., a micro-structure or reflectance element) and 3D printed on outer surfaces of a 3D printed object. The module (or described method) allows one to control and increase the appearance range of 3D printing processes without modifying the base materials (printer materials 162). FIG. 2 illustrates functions or steps of a pipeline carried out by the surface reflectance module 120 to control the reflectance of a 3D printed surface. It was assumed that the printer 160 can only generate surfaces with a matte and a glossy finish, which provides two corresponding base BRDFs, $f_b$ and $f_s$, that are diffuse and specular, respectively. The method carried out by module 120 involves replicating the effective reflectance of an input BRDF model by composing these two base BRDFs with custom micro-geometry of the surface (e.g., a plurality of micro-structures or reflectance elements each with a geometry providing a large number of facets or adjoining faces to reflect light optimized to have a desired normal distribution).

In a pre-process 210 (which may or may not be carried out by module 120, which may instead simply use the results provided in database 230), the based materials 212 of the printer are measured as shown at 213 to obtain the base numerical models or BRDFs, $f_b$ and $f_s$, as shown at 214. Then, the pre-processing 210 includes providing at 216 a set of numerical representations of reflectance such as a set of analytic NDFs. A micro-structure may be selected such as a dome-shaped reflectance element (e.g., circular base). Given as input the NDFs 216, a corresponding micro-geometry providing a plurality of facets of a particular shape and number may be computed as shown at 218. At 217, it is indicated that using the analytic NDF 216 as input, the hemispherical base shape can be optimized by providing discrete facets such that the micro-structure's geometry 218 has a normal distribution that corresponds to the desired NDF 216. This process may involve first generating a sampling of the NDF with blue noise property. For example, such a sampling may be performed to facilitate construction of the dome (or other-shaped reflectance element or micro-structure) by optimizing 217 the areas of the facets of a cell of a 3D Voronoi Diagram (as described below). Simulating 220 may be performed to measure 224 for each of the micro-structures 218 the effect of composing the geometry with the printing material (as shown with simulation input 215).

Using global illumination, the pre-processing 210 may include simulating 220 the resulting BRDF of a surface covered by the reflectance elements (e.g., domes defined at 218) taking into account the measured BRDFs of the base material at 213 used by the 3D printer. This analysis allows the analytic BRDFs to be fit to the simulated data and, thus, to predict the effect of both geometry and printing material on the final appearance of the 3D printed object/model. By optimizing and analyzing domes or other reflectance elements for different NDFs 216, the space of reproducible BRDFs is explored with the pre-processing (or model), and the BRDFs (or associated micro-structures and their geometry definitions) are stored in a database 230.

During runtime 240, the surface reflectance module 120 takes as input data from the database 230, a target reflectance 250, and the modeled surface geometry (surface of the transparent layer with a plurality of micro-structures) and outputs NDF parameters and density of the structures/reflectance elements on the surface (with optimization 260) at 270 to provide a surface reflectance that matches the input target reflectance. The runtime process 240 is a data-driven approach to synthesize an NDF to match a desired appearance of a printed 3D object. Given as input a target reflectance 250, the runtime processing 240 includes determining the geometry of domes (or other-shaped reflectance elements) at 270 with their placement density adapted on the surface to find the best approximation of the target BRDF. The inventors validated the method carried out by the module 120 by simulating, fabricating, and measuring the reflectance of a computed micro-structure surface and geometry of each structure for various NDFs. Further validation was provided through a demonstration that these micro-structures can be distributed on planar samples as well as on arbitrary 3D models, thus allowing one to print 3D models with spatially varying BRDFs.

The BRDF $f(\omega_i, \omega_0)$ of a material can be thought to arise from a micro-surface made up of perfectly specular micro-facets with varying orientations. The resulting specular BRDF is then governed mainly by the distribution of the normals of the micro-facets. Intuitively, given a light direction, $\omega_i$, and a view direction, $\omega_0$, only the mirrors with a normal equal to their half-angle, h, contribute to the reflected light. Therefore, the proportion of light reflected is equal to the proportion of micro-surface covered by facets with normal h: $f(\omega_i, \omega_0) \alpha p(h)$, where p(h) is the NDF. However, there is no simple direct relationship between an NDF and a BRDF because of the effects of masking and of the reflection properties of the micro-facets.

With these considerations in mind, a micro-geometry (e.g., a dome with many facets) is designed that has a controlled NDF as a first step toward the fabrication of BRDFs. To assist in stating requirements of the micro-geometry of each reflectance element, the following interpretation of the NDF, p(h) may be stated: given a half vector, h, with which one can observe the surface, p(h)dΩ is the probability that a randomly picked micro-facet of the surface lies in the infinitesimal solid angle dΩ around h. This requirement is continuous and realizing a surface from a continuous NDF is related to normal field integration, which is not always possible and depends on boundary conditions. Also, in the case of an NDF, there are no constraints on the spatial repartition of the normals so that the translation of an NDF into a normal field is also often not straightforward.

Hence, the inventors determined it would be better to construct a surface from a discrete set of normals that reconstruct the input NDF. Hence, given an NDF, a surface is generated with a discrete number of normals that fulfill the following guidelines: (1) the surface should have one facet for each normal in the sampling; (2) all facets should have roughly the same area; and (3) the sampling should reconstruct the input NDF.

FIGS. 3A to 3D illustrate NDF micro-geometry construction using a Voronoi Cell. Given a sampling of an NDF, $n_i$, as shown in graph 310 of FIG. 3A, a 3D Voronoi diagram 330 can be constructed (as shown in FIG. 3C) of the points $p_i = r_i n_i$ and the origin (see graph 320 of FIG. 3B), where the distance $r_i$ are positive numbers. The restriction of the Voronoi diagram to the central cell as shown in FIG. 3D is a convex surface having exactly one face for each normal of the sampling. FIGS. 3A to 3D are a 2D illustration of the construction of the NDF micro-geometry as a Voronoi Cell. From a set of normals $n_i$ (see FIG. 3A), the NDF geometry (see geometry 340 in FIG. 3D) is generated as a Voronoi Cell (see graph 330 of FIG. 3C). To construct the Voronoi diagram, a point, $p_i$, is created along each normal of the sampling 320 shown in FIG. 3B.

To adapt the areas of the faces of the dome, the distances of the points to the origins are interpreted as weights. To each normal vector, $n_i$, a radius, $r_i$, is assigned, and the distances of the point along the normal, $n_i$, are assigned to the origin. The observation can then be made that decreasing the distance, $r_i$, increases the area, $a_i$, of the face with normal, $n_i$, and, conversely, increasing the distance, $r_i$, decreases the area, $a_i$.

To generate a discrete dome (or other shaped reflectance element) that represents a desired NDF, the sampling of the normals preferably approximates as accurately as possible (or practical) the NDF. Moreover, as discussed next, the areas, $a_i$, should be optimized in order to reconstruct the NDF. Further, to be able to optimize the areas so that all faces have approximately the same area, it is helpful to have the initial normal sampling have the blue noise property. The ability to adapt the area of the facets depends on the freedom to have the faces grow or shrink. Hence, it is preferred that the distance between neighboring samples be maximal. To this end, one good sampling strategy to fulfill these two goals is to use a method based on Lloyd's relaxation. For example, one may employ Capacity-Constrained Voronoi Tessellation, which is an improvement of Lloyd's method that ensures the blue noise property as well as the adaptation to a distribution. In order to use this sampling technique, the orthogonal projection of the hemisphere to the plane may be used.

Figure 4A:
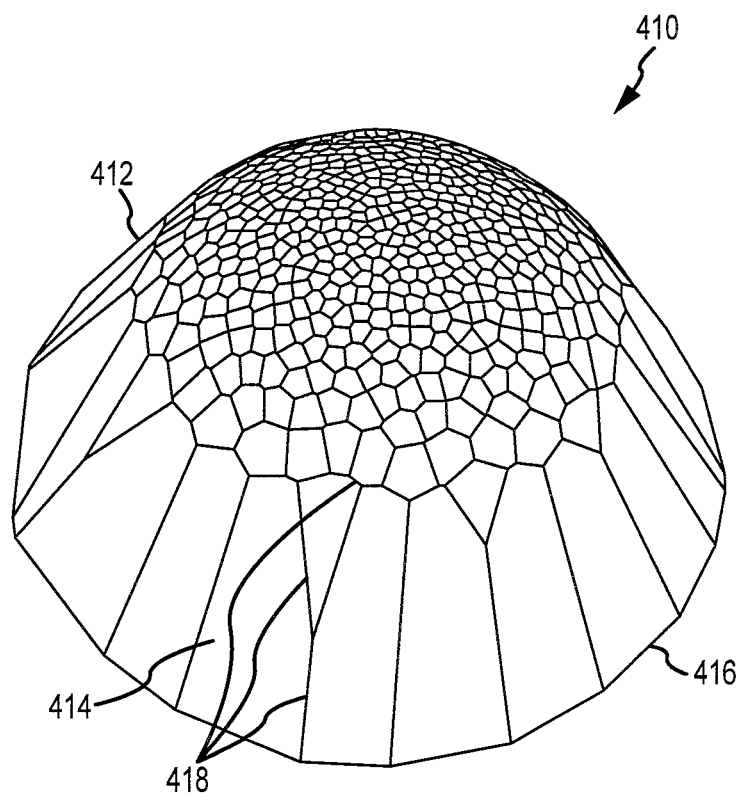
FIGS. 4A and 4B illustrate side perspective views of a dome-shaped reflectance element or microstructure before and after optimization, respectively, to equalize sizes/areas of the facets on the outer surface.

Next, it may be useful to explain in more detail how optimization of the face areas may be performed within the 3D printing system and corresponding method(s). Provided an adapted sampling of an NDF, building a reflectance element (e.g., a dome-shaped micro-structure) with equal distances, $r_i$, from the points to the origin yields a surface whose areas/facets are highly unbalanced. This can be seen from the dome-shaped reflectance element or micro-structure 410 of FIG. 4A (a dome before optimization), which has a body 412 defined by an outer surface 414 that extends out from a circular base 416 and the surface 414 has plurality of facets/faces 418 with unequal areas.

Figure 4B:
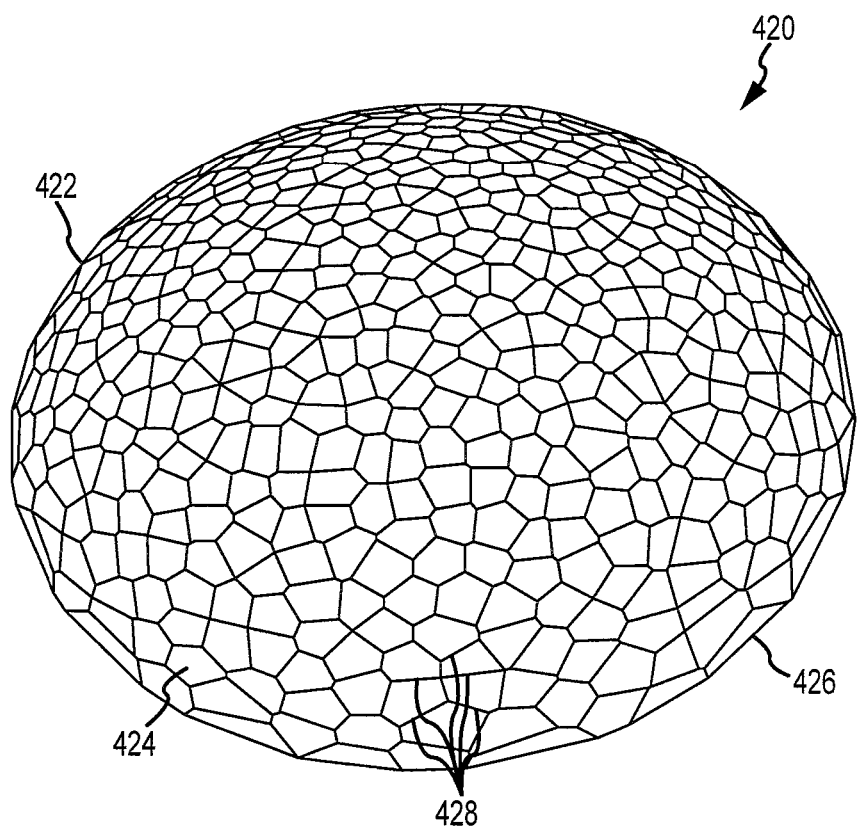

However, it is preferred that the micro-structure (which typically is formed of a transparent plastic or similar printing material used with 3D printers) have facets with similar or substantially equal areas. Such a dome-shaped reflectance element or micro-structure 420 is shown in FIG. 4B (a dome after optimization), which has a body 422 defined by an outer surface 424 that extends out from a circular base 426 and the surface 424 has a plurality of facets/faces 428 with equal or at least similarly sized areas. Both domes 410, 420 have the same normals but the areas are balanced after optimization. The inventors further evaluated the area optimization algorithm implemented to show typical convergence of the algorithm, to inspect the distribution of the areas of the facets with respect to the mean, and to check the algorithm using a plot of the weighted histogram of the areas of the facets. This verified that the resulting or optimized domes (e.g., micro-structure or reflectance element 420 of FIG. 4B) reconstructed the input NDF. It was observed that while the distributions with low exponents are reconstructed very precisely, reconstructing the peaks of very specular distributions can be more challenging.

Optimizing may be performed to balance the areas of the faces by least square optimization. Since it is desired that the areas, $a_i$, be equal, the error can be computed with respect to the mean, M, of the areas using the following equation:

$$E = \sum_i (a_i - M)^2$$

To solve the optimization problem, an iterative optimization procedure can be run. The areas are corrected (made similar/equal) by changing the distances in a direction that decreases the error on the faces/facets areas. More precisely, at each iteration, the distance, ri, are updated proportionally to the distance of $a_i$ to M as shown by:

For all $i, r_i \leftarrow r_i - \alpha(a_i - M)$

The iteration is continued until the error, E, is stable. By choosing a to be small enough, the algorithm converges to a minimum. To improve the stability, the vector, $r=(r_i)$, is scaled so that its largest component is equal to one. The number of iterations used to reach a satisfying minimum depends on the distribution and on the number of samples.

At this point of the description, it may be useful to discuss the effective BRDF of the micro-geometry (e.g., the geometry defining the micro-structure such as a dome as well as the number, shape, and size of the facets/faces on its outer surface). Even though a micro-geometry is generated with a precise normal distribution function, the resulting BRDF is not known a priori. In this regard, the micro-facet theory does not propose a one-to-one mapping between NDF and BRDF. The BRDF also depends on the arrangement of the facets, which influences the geometry attenuation factor. In addition, the printing material is not perfectly specular and, therefore, the composition of NDF and base BRDF should be considered.

Models for geometry attenuation factors have been developed by others but usually only consider V-groove geometry. This is because shadowing and masking is a global phenomenon and it is, therefore, difficult to derive analytic models for this phenomenon. Models that take into account the BRDF of the base material have also been developed. The composition of a BRDF has been modeled with a normal map by a convolution. For example, this model was used in one prior application and a deconvolution was applied to the NDF by the BRDF of the milled material to compensate for the blurring effect of the base material. More recently, bi-scale materials were edited and rendered considering both approaches. Starting from the rendering equation, these approaches expressed the effective BRDF of a surface patch as the integral of the product of the base material and a BVNDF (bidirectional visible NDF). The model is similar to convolution of a BRDF and an NDF, but the BVNDF takes shadowing and masking into account as well. In practice, evaluating the BVNDF is done by rendering the geometry under different lighting and viewing directions. This method provided to be suitable to accurately and efficiently render bi-scale materials but does not allow one to produce an NDF from a target BRDF.

To produce an NDF from a target BRDF, the inventors chose, in one implementation of the 3D printing system and method, to use rendering to measure effective reflectance of the micro-geometry of a reflectance element designed to be provided on a printed 3D object. In the following discussion, the assumptions and printing constraints are reviewed that were specific to a dome-shaped implementation of a reflectance element or micro-structure. The description then provides a model for the effective reflectance of the printed material. This includes a showing of how, using renderings, one is able to predict the effect of the micro-geometry taking into account visibility was well as base BRDFs. Then, a database of BRDFs is built that can be used to reproduce a target reflectance.

In one prototype implementation, the 3D printer utilized in the 3D printing system (and to carry out the 3D printing methods) was an Objet™ Connex 350 (distributed by Stratasys Ltd.) in part due to its geometric accuracy and its ability to print glossy materials. It is desirable to print or deposit a very specular material to be able to reproduce the widest range of specularity. In the following discussion, it is assumed that one can print the micro-geometry of a reflectance element (e.g., a dome with many facets on its outer surface) with a specular BRDF, $f_s$.

A constraint on the use of domes with circular bases is that the entire outer surface of a dome's body cannot be covered entirely. In the case of isotropic NDFs, the domes have a circular boundary (or base) so that the maximum density the can be achieved is the density of a circle packing. The remaining surface or background of the dome's body contributes to the effective reflectance and, since the roughness of this surface was not controlled in the prototype implementations, it is typically desirable to have an underlying base layer formed of material that is as diffuse as possible (with the base layer or its material labeled as background material, $f_b$).

With regard to representation of the printer materials, an analytic model may be used to model the printer materials, with the model being fit to actual measurements. In one implementation of the 3D printing system/method, Tango-Black+ covered with support material was used, which has a matte appearance, for the diffuse material, and VeroBlack+ without support material was used for the specular material. Thin layers of these materials were printed and then bent onto a cylinder to be able to capture a large range of incident light directions and view directions in a single shot.

FIGS. 5A-5D show top and side views of exemplary dome-shaped reflectance elements or micro-structures 510, 520, 530, 540 with increasing specularity as shown with increasingly large specular regions 519, 529, 539, 549. Each dome 510, 520, 530, 540 is defined by a circular base 516, 526, 536 having an identical diameter, $D_{Base}$ (e.g., 1 to 2 mm or less in some preferred cases). The structures 510, 520, 530, 540 have bodies 512, 522, 532, 542 defined by outer surface or sidewall 514, 524, 534, 544 extending outward from the outer periphery of the base 516, 526, 536, 546, and the height, $H_1$ to $H_4$, of the bodies 512, 522, 532, 542 defines the structures and also is shown to decrease with increased specularity (as seen from the top views with noiuial incident light where the proportion of the surface reflecting light towards the viewer increases), e.g., the domes become flatter to provide increased specularity. Each surface 514, 524, 534, 544 includes a plurality (e.g., 50 to 100 or more depending on the OD of the domes and the resolution of the 3D printer) of facets/faces 518, 528, 538, 548 that have been optimized (e.g., to have substantially similar (or even the equal) area) such as with the Blinn-Phong distribution or other technique. In other words, a modified Blinn-Phong BRDF model was fit to the measured samples, and the inventors' experiments showed that using a model with two Blinn-Phong specular lobes results in good fits of the measurements.

With regard to providing a model for the effective BRDF, models for the effective reflectance of rough surfaces have been used and have proven to be suitable for rendering. One common approach provides a formulation that sums the infinitesimal contribution of all micro-facets to the global reflection and relies on a probability distribution. Other formulations, though, start from the rendering equation, which may be better suited to the present application since it allows one to take into account the materials of the surface as well as the geometry.

Considering a surface with macroscopic normal, $\bar{n}$, covered with domes having faces with normals, $n_j$, and associated areas, $a_j$. The surface is printed with the BRDF, $f_b$, and a proportion, $\alpha$, of the surface is covered by domes printed with the BRDF, $f_s$. The effective BRDF, $\bar{f}$, of such a surface can be written by the following equation, when neglecting the visibility factors:

$$\bar{f}(\omega_o, \omega_i) = (1-\alpha) f b(\omega_i, \omega_o) + \frac{\alpha}{\bar{n} \cdot \omega_i \bar{n} \cdot \omega_o} \frac{\sum_j f_s(n_j, \omega_i, \omega_o) a_j (n_j \cdot \omega_i)(n_j \cdot \omega_o)}{\sum_j a_j (n_j \cdot \bar{n})} \quad \text{Equation 1}$$

This model shows that the reflectance of the printed surface can be modulated by varying $\alpha$. The other degree of freedom is the normal distribution of the domes. Although this model may not be practical for optimizing the NDF geometry, it shows that under some approximations the effective BRDF of the surface can be written:

$$\bar{f}(\omega_o,\omega_i)=(1-\alpha)f_b(\omega_i,\omega_0)+\alpha f_{micro}(\omega_i,\omega_0) \quad \text{Equation 2}$$

With this in mind, the following discussion presents use of this model to simulate the effective BRDF with an outer printed surface having numerous micro-structures in the form of many-faceted domes.

To verify that the use of the reflectance elements described herein provides control over the reflectance of a surface of 3D printed object, the measurements for planar samples was simulated. In particular, dome-shaped reflectance elements or micro-structures were generated for a Blinn-Phong normal distribution, $p(h)=(m+2/2\pi)(h \cdot n)^m$, with the exponent, $m$, in the range of $[1,1500]$. To maximize the density of the domes on the surface, the domes can be distributed on a planar sample with a hexagonal tiling. The images are rendered for a high number of view directions (e.g., 500 or the like) and with normal light incidence.

For each image, a sample of $\bar{f}$ is extracted by summing the radiance on the planar sample and dividing by the projected area of the square on the image. The simulation may be performed using the model fitted to the reflectance of the printer materials. The samples may be measured without rendering the background but only domes distributed upon it. This allows the measurement of the effective BRDF, $f_{micro}$, of the domes. Even though this does not specifically correspond with the printed samples, this experiment allowed the inventors to more directly evaluate the quality of the generated reflective skin/covering with a transparent layer having numerous micro-structures in the form of multi-faceted domes.

A set of planar samples were manufactured to implement and validate the ideas presented herein. Specifically, to fabricate planar samples as well as samples for measurements, an Objet Connex350 printer was used for the 3D printing of a 3D object. The printer allowed a material to be printed with a glossy finish or a matte finish. The matte finish was achieved by depositing or printing a layer of support material on top of the printed surface. The support material was then removed, and the portion of the surface that was in contact with the removed material had a matte finish. This is useful because it was desirable to print the surface between the domes with a glossy finish, but this also represents a limitation for printing arbitrary surfaces. Typically, only high field surfaces can be printed with a glossy finish. The domes in one implemented experiment were each composed of 1000 facets on the outer surface of the hemispherical-shaped body. On the printed models, it may not be readily possible to distinguish the individual facets, but a large number of facets is desired to run the simulation since domes with fewer facets may result in noisier effective BRDFs (however, the number of facets may vary widely from up to 100 to 1000 or more depending on the desired results, printer resolution, and other factors). A minimal size that may be useful for the domes/reflectance elements has not been determined by testing but, by experience, it is believed by the inventors that domes with a radius of up to 3 mm or larger (base having a maximum outer dimension of up to 6 mm or larger) may provide satisfying results while some implementations may utilized domes with radii of 1 to 3 mm while others may use a radii of less than about 1 mm.

With regard to printing color examples, the above discussion involved the use of a diffuse material and a specular material of the same color. The described methods and systems are also applicable to color printing (differing color used for the diffuse/colored layer underneath the specular material layer with the reflectance elements). For example, the inventors worked with gray scale BRDFs and with black materials. For the technique to be useable in a broader range of applications, one may utilize color diffuse material. This problem may be challenging with current printing technologies but will likely prove less troublesome in the near future with enhanced printers and printing materials. Generally, 3D printers that are able to print full color (such as the ZPrinter) are presently available, but the finish of the surface can be rough as a result of the printing process based on powder. The printouts are initially very matte, and one may cover the printouts with glue, wax, or epoxy to get a glossy finish. However, this process affects the whole surface, and it seems very hard to cover only the domes/reflectance elements.

To leverage this limitation, it may be useful to print transparent domes (or other-shaped reflectance elements) and mate them with a color surface. This may be done with a single 3D printer or the dome layer may be printed and then attached onto a color surface layer printed separately. For example, using a clear transparent material such as Vero-Clear™, highly glossy transparent domes may be printed with a 3D printer. The primary reflection of the dome contributes to the specular reflection, and the light that is transmitted into the micro-geometry is reflected by the diffuse, color material, which adds one or more color diffuse components to the global reflection of the surface of the 3D object.

Figure 6:
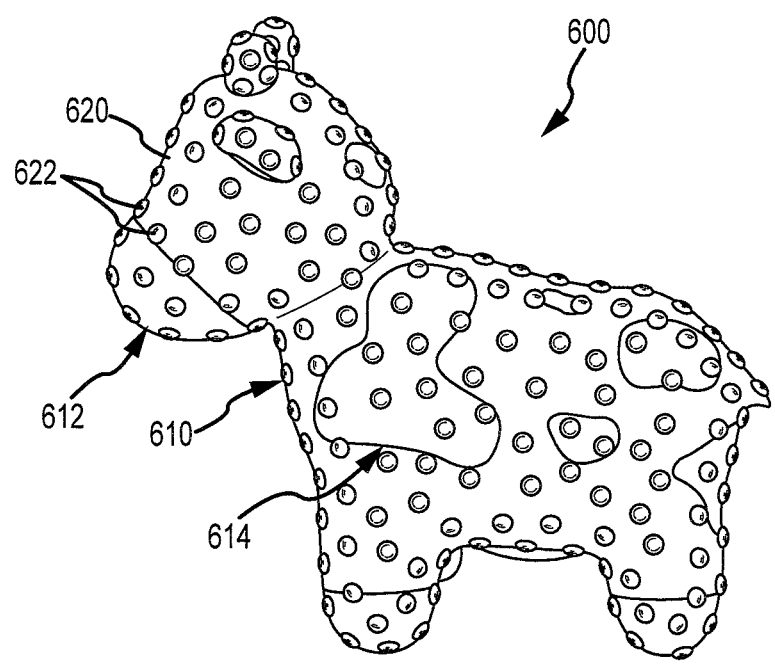
FIG. 6 illustrates a side view of a 3D printed object printed according to the present description.

Although in this implementation, other effects such as Fresnel reflection and caustics cast on the base surface should be taken into account, the inventors believe that this strategy may be useful such as when the printing technology allows printing of a clear transparent geometry over a diffuse surface. This concept was demonstrated as viable by producing a 3D printed object 600 that is shown in side view in FIG. 6. The 3D printed object 600 includes a body 610 (e.g., a cow-shaped body) with an outer colored diffuse layer having areas with differing colors 612 and 614, for example. The object 600 further includes an outer micro-structure layer 620 with a plurality of micro-structures or reflectance elements 622 (e.g., dome-shaped protrusions extending out from a planar surface/layer). The micro-structure layer 620 may have a first region (such as near the nose of the cow to cover region 612) that is more specular while a second region (such as over black spots 614) is more diffuse (i.e., the micro-structures may have two configurations (shapes and/or heights) to provide two custom reflectances or two sets of reflectance properties on the 3D printed object.

The 3D object 600 was used by the inventors to demonstrate that the printing techniques described herein are viable for producing a printed example with varying diffuse color and specularity. To produce the sample object 600, a diffuse model was printed using a ZPrinter and insets on the surface were created where transparent domes were placed/attached that were printed separately using VeroClear™ with an Objet™ Connect350 printer. For the 3D model, a constant density of the domes 622 was used over the diffuse surface 610 of the printed model. The distribution of the domes 622 was done using the Poisson Point sampling algorithm discussed above. The surface of the transparent layer 620 was covered with micro-structures having a geometry optimized for the modified Blinn-Phong NDF with exponents 10, 50, and 100. In this particular example, the nose region 612 of the cow's body 610 was covered with the most specular domes 622, and two other NDFs were used to increase the contrast between the fleck or spot regions 614 and the rest of the cow's body 610.

To validate the model further, Equation 2 may be used to compare the appearance of the theoretical and actual effective BRDF, $\bar{f}$. The domes may be distributed, for example, on a sphere using the vertices of an icosahedral tessellation as the location of the domes (or other-shaped reflectance elements). With this tessellation, the density of the surface covered by the micro-geometry is equal to $\alpha=0.86$. The reference images may be rendered using Equation 2 and with $f_{micro}$ in the achievable range. The fitted model of the printing materials for $f_b$ was used for both rendering and $f_s$ for the base BRDF of the domes. A rendering of such a sphere under environment lighting with a range of target reflectances was performed and showed the reconstructed reflectance using the inventors' model compared well with a target reflectance (target sphere).

To measure the BRDF of the base materials and of the domes with a generated micro-geometry, an image-based approach was used. A cylinder was printed that was covered with domes having a micro-geometry taught herein (using an NDF(s)), and the BRDF was measured on a row while the cylinder was rotating around its axis of symmetry. This setup allowed the inventors to perform the integration over a surface patch involved in the model of the effective BRDF. By taking long exposures of the rotating sample, integration can be performed in one direction. The other integration was done by averaging vertically the radiance of several rows having the same dome design. The measurement set up included a turntable on which the sample was placed. The set up also included a standard digital camera and a rectilinear light source. The measurement set up was surrounded by black cloth to avoid lighting from the environment. A rectilinear light source was used to allow the assumption that the incoming light directions were in a horizontal plane. The light source was a thin neon tube chosen to provide a white spectrum. HDR images were taken of the samples with the scaling of the curves being recovered by measuring the radiance reflected by a diffuse Spectralon sample under the same illumination conditions.

Figure 7:
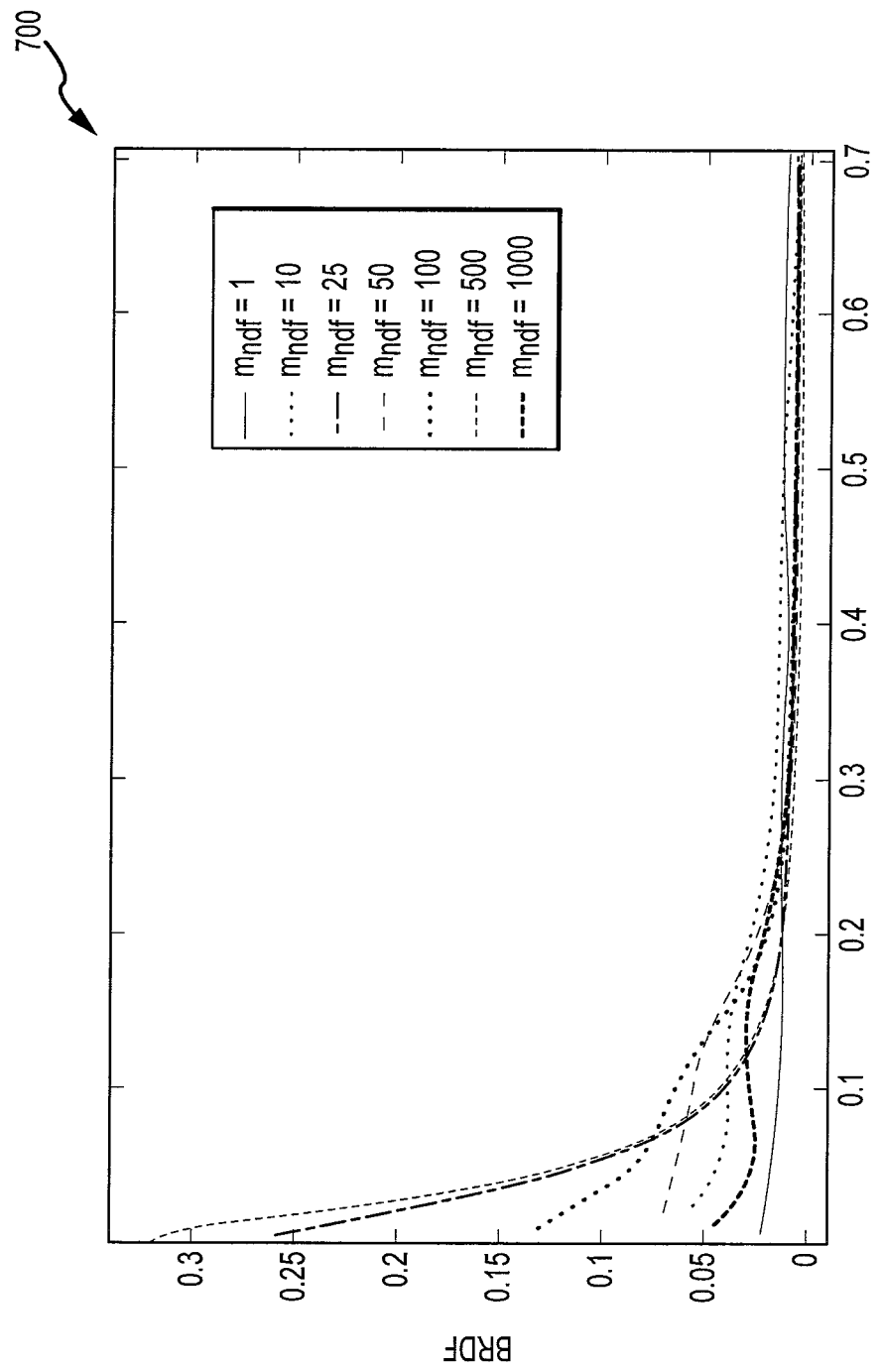
FIG. 7 is a graph showing measured effective BRDF on printed samples of an NDF with exponents 1, 10, 25, 100, 500, and 1000.

As part of this prototyping or validation process, the samples of the database (exponents 1, 10, 25, 100, 500, and 1000) were printed as to be distributed on a hexagonal lattice and with maximal radii. Graph 700 of FIG. 7 illustrates effective BRDFs measured on printed samples for exponents of the NDF 1, 10, 25, 100, 500, and 1000. It was verified that the measured BRDF have a profile resembling the Blinn-Phong BRDF. The exponents and specular coefficient of the measured material are higher than the ones observed in simulation. This difference may mainly be caused by the printing resolution. The 3D printer that was used prints the geometry/micro-structure layer in a layer-by-layer manner and even though these layers are very thin, the printed domes are not smooth but stair-shaped. As a result, the proportion of the surface being flat increases, which results in a higher specularity.

With regard to results achieved, planar samples were first generated with spatially varying reflectance. Gray level samples were initially printed since the pipeline was run with black printer materials. These samples were fabricated using an Objet™ Connex350 3D printer. Both the background surface (or diffuse layer) and the micro-structure layer were printed with VeroBlack+ in one run with the background printed with a matte finish. To demonstrate that the described micro-geometry can also be applied on 3D models, a color model was printed (e.g., the body of the cow shown in FIG. 6) with a ZPrinter. Then, this model was covered with a layer of transparent material (e.g., VeroClear™) with 3D domes printed with an Objet™ Connex350 3D printer.

The 3D printing methods (or algorithm) taught herein can also handle anisotropic BRDFs and optimize domes (or other-shaped reflectance elements) for the anisotropic Phong normal distribution. An anisotropic distribution may be generated and then the corresponding geometry of the domes of the transparent layer can be computed. It will be understood that specularity increases with an increase in a "vertical" direction (e.g., a circular dome will be less specular than a more oval dome and the more oval or elongated the dome the greater the specularity of the dome-shaped reflectance element). The normal distribution that was reconstructed is given by:

$$P_h(h) = \frac{\sqrt{(n_u+1)(n_v+1)}}{2\pi}(h \cdot n)^{n_u \cos^2(\phi)+n_v \sin^2(\phi)} \quad \text{Equation 3}$$

where $\phi$ is the angle between the projection of the half vector and the first axis of the tangent plane. Renderings show that a circular arrangement of the domes/structures on a micro-structure layer produces a brushed metal aspect. Disk-shaped micro-structure layers were rendered with anisotropic domes aligned along concentric circles for different combinations of the two NDF parameters, $n_u$ and $n_v$. Other arrangements of the domes/reflectance elements may be used to provide a desired density of the micro-structures (e.g., may be desirable to have an increased density of reflectance elements on a surface of the micro-structure layer). Printed disks with such anisotropic NDF geometry were produced and inspection was performed under the illumination of a spherical light source. The light direction varied from normal incidence to a direction almost aligned with the view direction.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The description presents a method for 3D printing spatially varying BRDFs. At the core of the method is a computational model for efficiently designing printable micro-structures that replicate a given NDF. To replicate an input BRDF, the description provides a data-driven approach that models the effective BRDF as two components, i.e., a diffuse background material layer and a micro-structure layer (e.g., a transparent layer with specular dome-shaped reflectance elements with desired, custom facet distributions). This design choice was motivated by available multi-material 3D printers that provide materials with varying specularity. For 3D printing, prototypes of 3D objects were printed using an Objet™ Connex350 machine, which can only reproduce glossy surfaces if they are not in contact with support material. This currently limits one-pass fabrication to geometries that can be represented as a height field. More complex shapes were fabricated, though, using a two-step process, which involved an assembly of the diffuse object shape and the separately printed micro-structure layer/film. However, given the rapid development of additive manufacturing and available base materials, it is likely that this current limitation will soon be resolved as 3D printers become more technologically advanced.

For analyzing and compactly representing the effective BRDF of the described micro-structures, the Blinn-Phong model was used as this is one of the most widely used analytic models in computer graphics. However, there are many other analytic models that could provide useful. Further, it may be desirable to investigate and characterize the gamut of reproducible BRDFs with the micro-structures described herein. In the above description, a hemispherical base shape was used in the micro-geometry (in the micro-structure layer), and this shape was optimized such that its normal distribution corresponded to a desired NDF. However, many other shapes are believed to be well suited for use with the described techniques. Still further, the density of the micro-structures may be optimized to suit a desired set of reflectance properties. With this in mind, it is recognized that, similar to a sphere-packing problem, the circular footprint of the dome-shaped reflectance elements limits the percentage of the surface that can be covered with this base shape. Hence, embodiments of 3D printed objects may include a micro-structure layer with reflectance elements with other base shapes that may be relatively easy to manufacture and apply on arbitrary 3D objects.

We claim:

1. A method for use in 3D printing an object with customizable reflectances, comprising:
   for a set of printing materials for a 3D printer, determining a bidirectional reflectance distribution function (BRDF) for a base diffuse layer and for a specular outer layer;
   with a set of normal distribution functions (NDFs), computing a corresponding geometry for a multi-faceted micro-structure;
   measuring reflectances of the specular outer layer with a surface of the specular outer layer comprising a plurality of the multi-faceted micro-structures corresponding to each of the NDFs with the set of printing materials;
   simulating a resulting BRDF of the base diffuse layer covered with the specular outer layer with the multi-faceted micro-structures;
   with an input target reflectance, determining a geometry of the multi-faceted micro-structures and a density on the surface of the specular outer layer to synthesize one of the NDFs; and
   operating a 3D printer to print a 3D object using the determined geometry and the set of printer materials.

2. The method of claim 1, wherein the determining the geometry comprises performing Voronoi optimization of to define facets of the micro-structures.

3. The method of claim 1, further comprising with an additional input target reflectance, determining an additional geometry of the multi-faceted micro-structures to synthesize another one of the NDFs and wherein the operating of the 3D printer comprises printing the 3D object using the determined geometry, whereby the printed 3D object has two or more reflectances.

* * * * *